Jan. 16, 1962 L. B. SMITH ETAL 3,017,615
MATRIX FRAME
Filed Nov. 19, 1957 2 Sheets-Sheet 1

INVENTORS.
Lloyd B. Smith &
James D. Childress
BY
ATTORNEY.

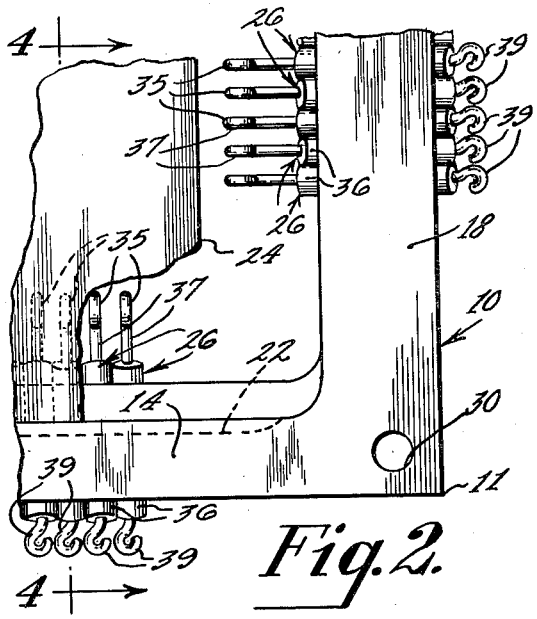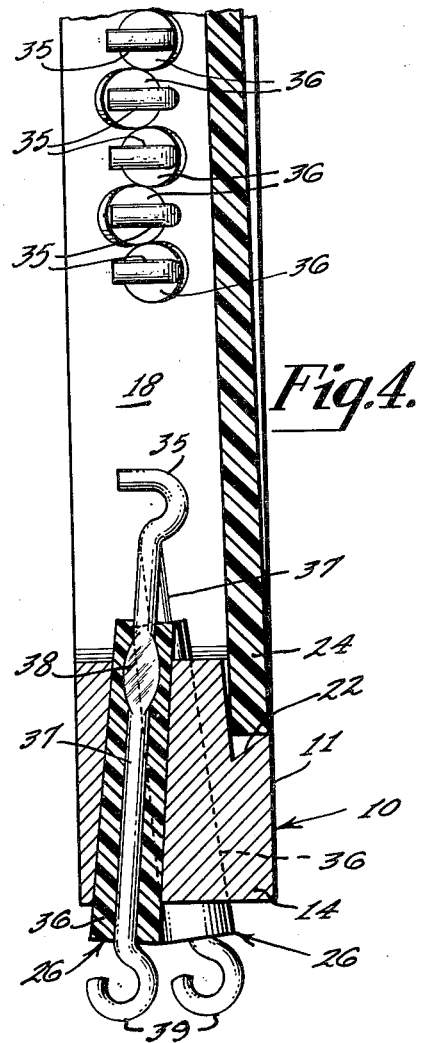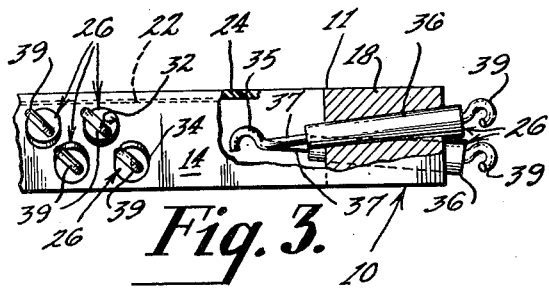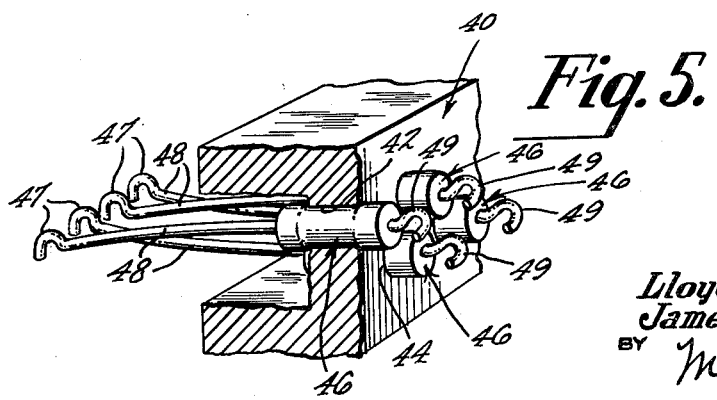
INVENTORS.
Lloyd B. Smith &
James D. Childress
BY
ATTORNEY.

3,017,615
MATRIX FRAME
Lloyd B. Smith, Dorchester, and James D. Childress, Boston, Mass., assignors to Radio Corporation of America, a corporation of Delaware
Filed Nov. 19, 1957, Ser. No. 697,438
13 Claims. (Cl. 340—174)

This invention relates to frames for mounting magnetic-core matrices and the manufacture thereof.

The prior frames of the type used for mounting magnetic-core matrices are inferior in one or more of the following respects; namely, they are either fragile or are difficult to manufacture, or are standardized for a particular magnetic-core matrix. Thus, certain of the prior frames are unsuited for use in environments involving mechanical stress or vibrations; others are difficult and expensive to manufacture, and still others involve expensive and time-consuming retooling costs when a change in size or shape of the matrix is requierd.

It is an object of the present invention to provide an improved matrix frame which obviates the above disadvantages.

More specifically, it is among the objects of the present invention to provide an improved matrix frame which, although rugged and inexpensive to manufacture, is suitable for use in adverse environments and is easily modified for use with different sizes and shapes of matrices without involving retooling.

According to the invention, the sides or arms of the matrix frames are provided by bars of metallic or non-metallic material having an array of spaced holes drilled therein for receiving feed-through terminal connections. Each feed-through terminal connection comprises a relatively stiff electrical conductor permanently fixed in an oversized bushing of insulating material. Each feed-through terminal is press-fitted within a different one of the spaced holes. The ends of the electrical conductors extending within the matrix frame are suitably formed to permit the matrix windings to be easily attached to the individual conductors with good, electrical and mechanical bonds.

A feature of the invention is the provision of an index slot along an inner edge of the frame to permit the fixing of a sheet of insulating material on the frame for supporting the matrix cores themselves, thereby insuring a rugged assembly of the entire unit.

In the accompanying drawing:

FIG. 2 is a top view, partially broken away, and somewhat enlarged, of a fragmentary portion of the matrix frame of FIG. 1;

FIG. 3 is a front elevational view, partially in section, of the matrix frame portion of FIG. 2;

FIG. 4 is a sectional view of the matrix frame portion taken along the line 4—4 of FIG. 2, and FIG. 5 is a perspective view of a portion of another form of matrix frame according to the invention.

Figure 1:
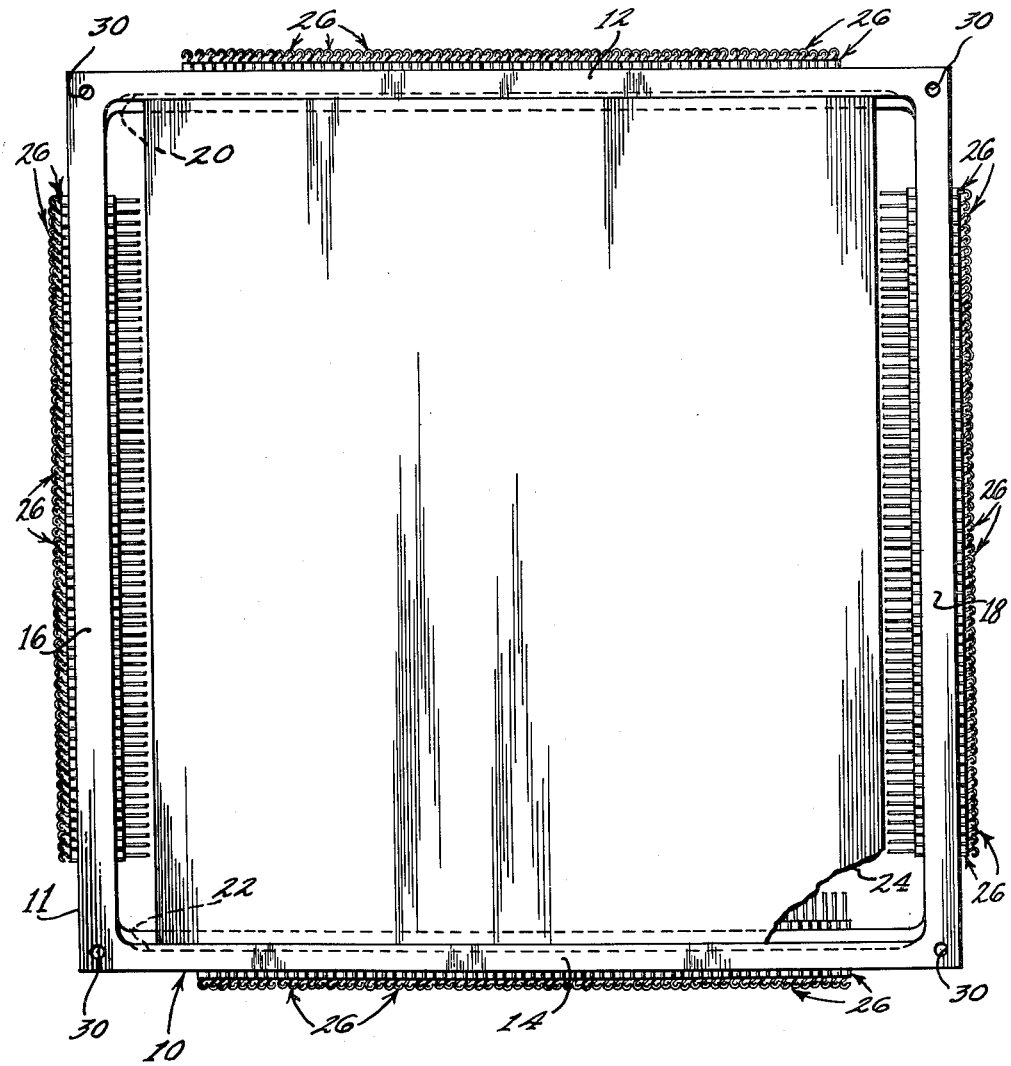
FIG. 1 is a top view of a matrix frame according to the invention.

In FIG. 1, the matrix frame assembly 10 is made up of an outside frame 11 of the open type, including an upper piece 12 and a lower piece 14, separated from each other by left and right-hand side pieces 16 and 18. Each of these pieces is similar to the other and each is a part of a standard bar. The same standard bar may be used for mounting any desired shape or size of core matrix. For example, the frame may be used with a square-shaped matrix, such as the 64 x 64 matrix of FIG. 1, a rectangular matrix, a hexagonal matrix, etc. The standard bar may be a solid metal bar as shown, or may be an extruded U-shaped channel bar, as described hereinafter.

During assembly, the four frame pieces are suitably beveled at their ends and are rigidly fastened together by any suitable means, such as welding, to form the frame 11.

Notches or rabbets 20 and 22 are cut in two of the frame pieces, for example, in the upper and lower pieces 12 and 14, for receiving a single top piece 24 of suitable insulating material. The top piece 24, for example, may be of plastic material. The top piece 24 is made somewhat oversized in length so that, after assembly, the top piece becomes somewhat bowed so as to provide increased support for the matrix cores at the center of the array. The magnetic matrix cores and windings may be cemented to the top piece 24 after the magnetic matrix windings are tied and soldered to the feed-through terminals 26. The manner of fastening the feed-through terminals 26 in the various pieces of the frame 11 is described hereinafter. Each feed-through terminal 26 is connected to a different matrix winding.

After assembly, the matrix frame 11 provides a rugged unit which is, for all practical purposes, unaffected by mechanical stresses or vibrations which may occur in any environment in which the magnetic-core matrix is used. Note, however, that the frame 11 still retains the advantages of the open type, such as ease of cooling by convection currents, ease of stacking, etc. Suitable holes, such as the holes 30, may be drilled in each of the corners of a matrix frame 11 to facilitate the assembly of a plurality of matrix assemblies 10 into a single unitary system. If desired, joints may be cut in one of the matrix frame pieces to aid in the stacking of a plurality of the matrix assemblies 10.

Details of the matrix frame 11 are shown in FIGS. 2, 3, and 4. As shown in FIG. 3, the spaced array of holes in the standard bar comprises an upper row of holes 32 and a lower row of holes 34. Each of the frame pieces 12, 14, 16 and 18 of the frame 11 has the same spaced array of holes therein. The alternate location of successive ones of the holes 32 and 34 provides a means for locating a maximum number of the feed-through terminals 26 in a minimum space along a frame piece.

As shown in FIGS. 3 and 4, the upper holes 32 are tapered and are inclined at a slight, downward angle to the horizontal. The lower holes 34 also are tapered and are inclined at a slight, upward angle to the horizontal. The inclination of the holes 32 and 34 is provided in order to bring the ends of the feed-through terminals 26 to the same horizontal level within the matrix frame 11, as shown in FIGS. 2-4. By so locating the ends of the feed-through terminals 26, the mechanical and electrical connections of the matrix windings, not shown, to the hooked ends 35 of the feed-through connectors 26 is facilitated. The holes 32 and 34 in the lower frame piece 14 are respectively aligned with the holes 32 and 34 in the upper frame piece 12, as are the holes 32 and 34 in the side pieces 16 and 18.

As shown in FIG. 4 each feed-through terminal 26 comprises a stiff, electrical conductor 37 and a bushing 36 of insulating material formed about or inserted over the conductor 37. A hook 35 is provided in the end of each conductor 37 for ease in fastening the matrix windings. Also, an eye 39 is provided in the other end of each conductor 37 for ease in assembling a plurality of matrix frames using bus bars. Insulating material is required for the bushing 36, when the standard bar of the frame 11 is made from metal, in order to achieve increased mechanical strength. A suitable material for the insulating bushing 36 is a plastic material; for example, the bushing 36 may be a tetrafluoroethylene resin rod.

The conductor 37 has an upset portion 38 within the bushing 36 to provide a non-slip mechanical fit between the bushing 36 and the conductor 37. After the holes 32 and 34 of the standard bar are drilled, bored, or punched, they are finished to size, using a taper ream which provides a slight taper from the outside to the inside surface of the standard bar. The bushing 36 of the feed-through terminal 26 is made larger in diameter than the finished holes 32, 34, in order to provide a permanent, mechanical bond when the feed-through terminal 26 is press-fitted through a hole 32 or 34 in the frame 11. Thus, the taper of the hole, together with the oversize bushing, provide a simple, inexpensive and rapid means for mounting a plurality of electrical terminals for a magnetic-core matrix. There is substantially no rotation of the feed-through terminals 26 even in adverse mechanical environments.

The standard bar used in making a matrix frame 11 may be constructed from a U-shaped channel bar 40, as shown in FIG. 5. The U-shaped channel bar 40, for example, may be aluminum or any other suitable metallic or non-metallic material. The bar 40 may be extruded, or may be formed in any suitable manner. Spaced holes 42 and 44 are alternately provided in the bar 40 for receiving feed-through terminals 46.

The holes 42 and 44 may be straight, untapered holes having their axes parallel to each other. In such case, the electrical conductors 48 of the feed-through terminals 46 are formed so that all ends 47 lie in substantially the same horizontal plane within a matrix frame 11. That is, the conductors 48 of the upper holes 42 are shaped to have a convex curve, looking from the top, while the conductors 48 within the lower holes 44 are shaped to have a concave curve. The conductors 48 may be shaped, as a manufacturing step, either before or after the insertion of the feed-through terminals 46.

The matrix frame 11 of FIGS. 1 and 2 also may be made with straight, untapered holes 32 and 34, if desired. In the latter case, the conductors 37 within the matrix frame would be alternately shaped to have convex and concave curvatures so as to bring their hooks 35 within the same horizontal plane.

In the embodiment of the invention illustrated in FIG. 1, sixty-six feed-through connectors 26 are provided on each side of the matrix frame 11. Sixty-four of the connectors 26 are used to connect with sixty-four row and column windings of the 64 x 64 matrix. The other two connectors 26 may be used, respectively, for connecting to a matrix sensing winding and a matrix inhibit winding.

In a specific illustrative embodiment of the invention according to FIG. 1, the matrix frame 11 was 8 x 8 inches, using solid aluminum-bar stock .375 inch wide by .300 inch thick. A #43 drill was used to drill the holes 32 and 34, and a 4–0 taper ream was used to ream the holes 32 and 34 to .100 inch in diameter. The holes 32 were provided with a 4° taper, and the holes 34 were provided with a 5° taper from the plane of the matrix frame. The center of the holes 32 was located .072 inch from the bottom of the matrix frame, and the centers of the holes 34 were located .180 inch from the bottom of the matrix frame. The bushings 36 were of tetrafluoroethylene resin rod ⅛ inch in diameter and ½ inch in length. The conductors 27 were of No. 40 copper wire.

There have been described herein improved matrix frames for use with magnetic-core matrices. The frames described provide rugged, economical units which may be fabricated quickly to any desired shape or size without any additional retooling costs. The matrix assembly is suitable for use in adverse environments involving mechanical stresses and vibrations.

A plurality of the matrix assemblies, according to the invention, may be stacked with relative ease either in a vertical or a horizontal stack. In either case, all the bus bars may be used to connect corresponding ones of the conductors 37 or 48 of FIGS. 1 and 5.

What is claimed is:

1. A matrix frame comprising metal bars rigidly fastened together at the ends thereof, each said bar having a spaced array of holes therein, and a plurality of feed-through terminals, each said feed-through terminal being fitted in a different one of said holes, said feed-through terminals each comprising a rod of insulating material about a relatively stiff electrical conductor, said conductor having an upset portion within said rod, and the ends of said conductors within said frame all lying in substantially the same plane.

2. A matrix frame comprising a rigid frame made from metal bars fastened together at the ends thereof for providing a support means for a magnetic core matrix having windings, each said bar having a spaced array of holes therein, a plurality of feed-through terminals, each said feed-through terminal being press-fitted in a different one of said holes for connection to a different one of said matrix windings, said feed-through terminals each comprising a rod of insulating material formed about a relatively stiff electrical conductor, said conductor having an upset portion within said rod, the ends of said conductors within said frame being provided with a hook for connection to said matrix windings, and all said ends of said conductors lying in substantially the same plane.

3. A matrix frame as claimed in claim 2, said metal bars being U-shaped channel bars.

4. A matrix frame as claimed in claim 2, said metal bars being U-shaped channel bars, and the axes of all the holes of any one of said bars being substantially parallel to each other.

5. A matrix frame as claimed in claim 2, said metal bars including upper and lower pieces separated from each other by side pieces, each said array of holes in each of said bars being arranged in two rows with alternate holes being located in alternate rows, the holes of opposite ones of said pieces being aligned with each other.

6. A matrix assembly comprising a rigid frame made from metal bars fastened together at the ends thereof for supporting a magnetic-core matrix having windings, each said bar having a spaced array of holes therein, one of said bars having an inclined notch having sides along the inner edge thereof, a plurality of feed-through terminals for connection to the windings of said magnetic-core matrix, each said feed-through terminal being press-fitted in a different one of said holes, said feed-through terminals each comprising a rod of insulating material about a relatively stiff electrical conductor, said conductor having an upset portion within said rod, the ends of all said conductors within said frame lying in substantially the same plane, and a plate of insulating material fitted in one opening of said frame and bearing against the sides of said notch for supporting the cores of said core matrix after said matrix windings are attached to said feed-through terminals.

7. A matrix frame comprising bars rigidly fastened together at the ends thereof, each said bar having a spaced array of holes therein, a plurality of feed-through terminals for connection to the windings of a magnetic-core matrix, each of said feed-through terminals being press-fitted in a different one of said holes, said feed-through terminals each comprising an oversized bushing of material formed about a relatively stiff electrical conductor, said conductor having an upset portion within said bushing, and the ends of said conductors within said frame all lying in substantially the same plane.

8. A matrix frame as claimed in claim 7, wherein said bars are of metallic material, and said bushings are of insulating material.

9. A matrix frame as claimed in claim 7, wherein said bars are metallic U-shaped channel bars, and said bushings are of insulating material.

10. A matrix frame comprising a rigid frame made from metal bars fastened together at the ends thereof for providing a support means for a magnetic core matrix having windings, each said bar having a spaced array of tapered holes therein, said holes being aligned in rows, and alternate holes being in alternate rows, a plurality of feed-through terminals, each said feed-through terminal being press-fitted in a different one of said holes for connection to a different one of said matrix windings, said feed-through terminals each comprising a rod of insulating material formed about a relatively stiff electrical conductor, said conductor having an upset portion within said rod, the ends of said conductors within said frame being provided with a hook for connection to said matrix windings, and all said ends of said conductors lying in substantially the same plane.

11. A matrix frame comprising a rigid frame made from metal bars fastened together at the ends thereof for providing a support means for a magnetic core matrix having windings, each said bar having a spaced array of holes therein, said holes being in two rows with alternate holes being in alternate rows, said holes of one of said rows being inclined in one direction, and said holes of said other of said rows being inclined in the other direction, a plurality of feed-through terminals, each said feed-through terminal being press-fitted in a different one of said holes for connection to a different one of said matrix windings, said feed-through terminals each comprising a rod of insulating material formed about a relatively stiff electrical conductor, said conductor having an upset portion within said rod, the ends of said conductors within said frame being provided with a hook for connection to said matrix windings, and all said ends of said conductors lying in substantially the same plane.

12. A matrix frame comprising a rigid metal frame for providing a support means for a magnetic core matrix having windings, said frame having four arms, each said arm having a spaced array of holes therein, each of said holes being tapered, said holes being aligned in rows, a plurality of feed-through terminals, each said feed-through terminal being press-fitted in a different one of said holes for connection to a different one of said matrix windings, said feed-through terminals each comprising a rod of insulating material formed about a relatively stiff electrical conductor, said conductor being provided with a non-slip mechanical fit in said rod, the ends of said conductor within said frame being provided with a hook for connection to said matrix windings, and said ends of said conductors within said frame lying in substantially the same plane.

13. A matrix frame comprising four arms rigidly attached to each other, and each having a spaced array of holes therein, and a plurality of feed-through terminals, each said feed-through terminal being fitted in a different one of said holes, said feed-through terminals each comprising a rod of insulating material about a relatively stiff electrical conductor, said conductor being provided with a non-slip mechanical connection within said rod, and the ends of said conductors within said frame all lying in substantially the same plane.

References Cited in the file of this patent

UNITED STATES PATENTS

| 2,433,911 | Johnston | Jan. 6, 1948 |
| 2,846,672 | Hennessey | Aug. 5, 1958 |

FOREIGN PATENTS

| 618,522 | Great Britain | Feb. 23, 1949 |

OTHER REFERENCES

Tele-Tech and Electronic Industries, July 1954 (page 53 relied on).

Electronics, March 1955 (page 194 relied on).

"Ferrites Speed Digital Computers," by Brown et al., Electronics, April 1953, pp. 146 to 149 and front cover.